Patented June 1, 1937

2,082,560

UNITED STATES PATENT OFFICE 2,082,560

ISOVIOLANTHRONE DERIVATIVES AND THEIR PREPARATION

Alexander John Wuertz and William Hiram Lycan, South Milwaukee, Wis., assignors to E. I. du Pont de Nemours & Company, Wilmington, Del., a corporation of Delaware No Drawing. Application October 18, 1935, Serial No. 45,576

14 Claims. (Cl. 260—61)

This invention relates to carbon compounds and more particularly to derivatives of isoviolanthrones and their preparation. It especially appertains to the substances produces by treating isoviolanthrones having free Bz2, Bz2' positions with an aldehyde (R—CHO), a carboxylic acid halide (R—CO—halogen), a di-halo-methyl compound (R—HC—halogen$_2$, R—C—halogen$_2$—R) a carboxylic acid anhydride

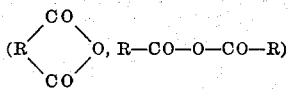

or a sulfonyl halide (R—SO$_2$—halogen) until one molecular proportion of the treating compound or compounds has been reacted with one molecular proportion of the isoviolanthrone. The invention also includes treating the mono-substituted isoviolanthrones, obtained as above described, with oxidizing agents and subsequently stabilizing the products.

It is well known by those skilled in the art that compounds known as benzanthrones are produced when compounds of the anthraquinone series are condensed with glycerine (see U. S. of America Patents 818,992 of April 24, 1906 and 809,892 of Jan. 9, 1906 to Bally and Isler and 786,085 of March 28, 1905 to Bally). When benzanthrones are treated with halogenating agents under appropriate conditions there are produced compounds known as mono-halogenated benzanthrones (see French Patent 349,531 of Oct. 1, 1906 and its addition No. 6,719 of Jan. 10, 1906 and German Patent 193,959). When halogenated benzanthrones are heated under appropriate conditions there are produced compounds known as isoviolanthrones (see, for example, German Patent 194,252, U. S. P. 906,367, Color Index 1103, Enzyklopädie der Küpenfarbstaffe—Truttwin—1920 and Das Anthracen und die Anthrachinone—Houben—1929).

While the chemical structure of isoviolanthrone is not positively known, it is generally believed to be as follows:

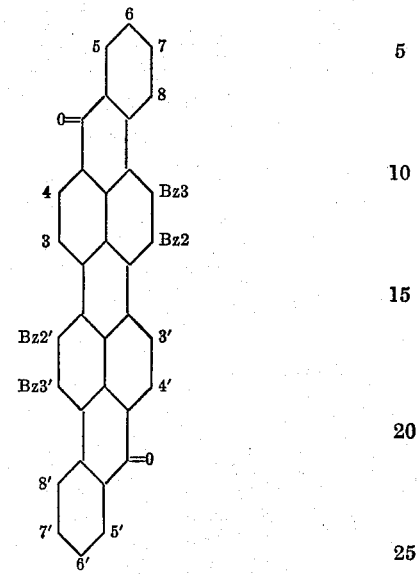

The numbers given in the formula are those usually assigned to the positions they adjoin.

Compounds having this general structure are powerful vat dyes. Since their discovery a tremendous amount of research work has been expended upon them. This work has developed the fact that two positions of such a nucleus are more reactive than the others. It is the general belief that the Bz2, Bz2' positions are the ones showing this particular activity.

It has now been found that new organic chemical compounds, new vat dyes, new vat colors, new colored carbon compounds, new pigments, new intermediates, new vattable compositions of matter and new isoviolanthrone derivatives may be produced by condensing isoviolanthrones with one molecular proportion of a member of the group comprising aldehydes, carbonyl halides, dihalomethyl compounds, carboxylic acid anhydrides and sulfonyl halides and if desired thereafter treating the mono-substituted isoviolanthrones with oxidizing agents and subsequently alkylating the oxidized products.

The invention has for an object the preparation of new chemical compounds, new derivatives of isoviolanthrones and new processes for the production of isoviolanthrone derivatives. Other objects are the preparation of a new series of carbon compounds, particularly isoviolanthrones in a very desirable physical form and in a high state of purity. Still further objects are to produce new vat dyes and to devise new chemical processes. A general advance in the art and other objects which will appear hereinafter are also contemplated.

The foregoing objects and related ends are accomplished in the manner set out in the following description in which details of what is believed to be the best mode for carrying out the invention are disclosed.

Specifically, one method for accomplishing the aforementioned objects, carrying out the previously referred to new processes and obtaining the newly discovered products is by treating (or condensing or reacting) isoviolanthrones having free Bz2, Bz2' positions with the various reagents enumerated above and their chemical equivalents.

The invention will be further understood by a consideration of the following detailed description and illustrative specific examples in which the quantities are given in parts by weight.

PREPARATION OF MONO-SUBSTITUTED ISOVIOLANTHRONES

I—With Carbonyl Halides

Example I

Six hundred (600) parts of anhydrous antimony trichloride were melted and heated to 180° C. and to the same was added under good agitation 300 parts of powdered aluminum chloride. The temperature dropped under this addition to about 100°–110° C. Heat was applied and the temperature raised to 150° C. where it was held until the resulting melt became entirely homogeneous. The melt was then allowed to cool to 95°–100° C., whereupon 100 parts of isoviolanthrone were added portion-wise at such a rate that the temperature was maintained. When the melt was again homogeneous, 74 parts of 1-chloro-anthraquinone-2-carbonyl chloride were added at the same temperature and again at such a rate that the temperature was maintained. When this addition was complete heat was applied and the temperature raised to 140°–180° C. and maintained within these limits for 1–6 hours. When the condensation was complete the reaction melt was allowed to cool to 120°–130° C. and was then drowned in a cold solution of hydrochloric acid (containing 5–10% HCl). The resulting suspension was agitated and heated to 90°–100° C. and was subsequently filtered. The cake was washed on the filter with hot dilute hydrochloric acid solution until free from heavy metal salts. It was then washed free from acid and hot water and finally dried. The product thus obtained was a fine black powder which dissolved in sulfuric acid to a green color. It was readily soluble in an alkaline (for example sodium hydroxide) hydrosulfite. It vats to a reddish-blue vat from which cotton was dyed in pure blue shades which turned to a red-violet upon oxidation in air. The dyeings have excellent general fastness. The dye may be made into dye pastes having excellent characteristics. Pastes prepared from the dye may be used either for dyeing or printing.

Products having the same general characteristics and analogous chemical structures which are similar in appearance and behavior, varying slightly as to shade in dyeing, are obtained if, in the place of 1-chloro-anthraquinone-2-carbonyl chloride, there are utilized other carbonyl halides. For example, special mention may be made of such other compounds as para-nitrobenzoyl-chloride, 1,9-anthrathiazole-2-carbonyl chloride, 1,9-anthrathiazole-4-carbonyl-chloride, 1,9-anthrathiazole-5-carbonyl chloride, meta-nitro-benzoyl-chloride, ortho-nitro-benzoyl chloride, 3-chloro-anthraquinone-2-carbonyl chloride, 1-chloro-anthraquinone-4-carbonyl chloride, 1-chloro-anthraquinone-6-carbonyl chloride and 1-chloro-anthraquinone-7-carbonyl chloride, 1,9-anthraselenazol-2-carbonyl chloride, 1,9-anthraselenazol-4-carbonyl chloride, 1,9-anthraselenazol-5-carbonyl chloride, 1,9-anthrathiophene-2-carbonyl chloride, 1,9-anthrathiophene-4-carbonyl chloride, 1,9-anthrathiophene-5-carbonyl chloride, ortho-chloro-benzoyl chloride, benzoyl bromide, para-nitrobenzoyl bromide, chloro-benzoyl bromides, benzoyl chloride, para-brom-benzoyl chloride, alpha-naphthoyl chloride, beta-naphthoyl chloride, anthraquinone-2-carbonyl chloride, anthraquinone-1-carbonyl chloride, 1-nitro-anthraquinone-6-carbonyl chloride, 1-nitro-anthraquinone-2-carbonyl chloride, phthaloyl chloride, succinyl chloride, oxalyl chloride, para-methyl-benzoyl chloride, acetyl chloride, butyric acid chlorides, and their analogs and homologs.

Example II

A melt consisting of 200 parts of antimony chloride and 100 parts of aluminum chloride was prepared as described in Example I. To this melt at 110°–120° C. there was added 35 parts of isoviolanthrone at such a rate as to maintain the temperature. The resulting melt was agitated within these temperature limits until homogeneous after which 20 parts of benzoyl chloride was dropped in at such a rate as to maintain the temperature. The resultant melt was heated gradually to 155°–160° C. whereat it was held until the reaction was complete. It was then poured into a large excess of 5–10% HCl solution. The precipitated dye was isolated in the manner set forth in Example I. It was thus obtained as a fluffy blue black powder which yields green solutions in concentrated sulfuric acid. It is soluble in alkaline hydrosulfite to a reddish-blue vat from which cotton is dyed in reddish-violet shades.

II—With Carboxylic Acid Anhydrides

Example III

A melt composed of 600 parts of antimony trichloride and 300 parts of aluminum chloride was prepared as described in Example I. To this melt at 95°–100° C. there were added 100 parts of isoviolanthrone (isodibenzanthrone) and subsequently 38 parts of phthalic anhydride at such rates as to maintain the temperature. When the addition of the intermediates was complete, heat was applied and the temperature raised to 140°–180° C. It was held within these limits for 1–6 hours, after which it was allowed to cool to 120°–130° C. and the melt drowned in a 5–10% HCl solution.

The suspension was then treated in a manner similar to that described in Example I and the finished product isolated in like manner. The new dye thus obtained as a finely divided black powder was similar in appearance to the product of Example I. It yields green sulfuric acid solutions and vats to a red-blue alkaline hydrosulfite vat. Cotton is dyed in violet shades of excellent fastness by this product. Generally similar products are obtained when other carboxylic acid anhydrides are utilized. Special mention may be made of such products as acetic anhydride, benzoic anhydride, chloro-benzoic acid anhydrides, paranitro-benzoic acid anhydride, para-brom-benzoic acid anhydride, alpha-naphthoic acid anhydride, beta-naphthoic acid anhydride, anthraquinone-2-carboxylic acid anhydride, succinic anhydride, para-methyl-benzoic acid anhydride, butyric acid anhydrides, propionic acid anhydrides, and their analogs and homologs.

Example IV

A melt consisting of 200 parts of antimony trichloride and 100 parts of aluminum chloride was prepared as in Example I. When the melt had become homogeneous, the temperature was adjusted at 135°–140° C. and there was added a mixture of 35 parts of isoviolanthrone and 25 parts of benzoic anhydride. The rate of addition was such as to maintain the temperature. When the addition was complete, the temperature was raised to 160°–165° C. and was maintained within these limits until the reaction was complete. The melt was then drowned in excess 5–10% HCl solution and the dye was isolated as described in Example I. The dye thus obtained was identical in every respect with the product of Example II.

III—With Sulfonyl Halides

Example V

A melt composed of 250 parts of anhydrous antimony tri-chloride and 125 parts of aluminum chloride was prepared as described in Example I. There was introduced into this melt at 95°–100° C., 50 parts of isoviolanthrone and subsequently 35 parts of anthraquinone-2-sulfonyl chloride at such rates as to maintain the temperature. Heat was then applied and the temperature raised to 140°–180° C. and held within these limits for 1–6 hours. When the reaction (condensation) was complete the reaction melt was drowned in 5–10% hydrochloric acid solution and the finished color isolated in the manner previously described.

The new dye thus obtained is a black powder containing sulfur and yielding green solutions in sulfuric acid. Its vat is somewhat greener than those of Examples I and III and cotton is dyed in slightly greener shades of blue. The fastness properties of this product are excellent. Other sulfonyl halides may be used in a similar manner, special mention being made of anthraquinone-1-sulfonyl chloride, benzene-sulfonyl chloride, para-brom-benzene-sulfonyl chloride, 2-nitro-toluene-4-sulfonyl chloride, 1-nitro-anthraquinone-6-sulfonyl chloride, anthraquinone-2,6-di-sulfonyl chloride, anthraquinone-2,7-di-sulfonyl chloride, methoxy sulfonyl chloride, 1-chloro-anthraquinone-2-sulfonyl-chloride, 1-nitro-anthraquinone-6-sulfonyl bromide, 1-amino-anthraquinone-2-sulfonyl chloride, naphthalene-sulfonyl chloride, chloro-naphthalene-sulfonyl chloride, nitro-naphthalene-sulfonyl-chloride, ortho-chloro-benzene - sulfonyl-chloride, para-nitro-benzene-sulfonyl chloride, meta-nitrobenzene-sulfonyl chloride, butane-1-sulfonyl chloride, methane-sulfonyl chloride, and their homologs and analogs.

Example VI

A melt consisting of 200 parts of antimony trichloride and 100 parts of aluminum chloride was prepared as in Example I. When it had become homogeneous, the temperature was adjusted at 125°–130° C. and there was added a mixture of 35 parts of isoviolanthrone and 24 parts of p-toluene-sulfonyl-chloride. The rate of addition was such as to maintain the temperature. Heat was then applied and the temperature raised to 160°–165° C. whereat it was held until the reaction was complete. The melt was then drowned in excess 5–10% HCl solution and the product was isolated as in Example I. There was thus obtained a black powder which yields green sulfuric acid solutions. It is soluble in alkaline hydrosulfite to yield a reddish-blue vat from which cotton is dyed in violet shades. The dyeings are somewhat duller than those of the product of Example II.

IV—With Aldehydes

Example VII

Five hundred (500) parts of antimony trichloride were heated to 180° C. To this melt was added 250 parts of anhydrous aluminum chloride under agitation. During the addition the temperature dropped to 100°–120° C. It was raised to 150°–155° C. in order to permit the aluminum chloride to digest completely. When a clear solution was obtained the temperature was lowered to 100°–120° C. When this was accomplished 100 parts of isoviolanthrone were introduced into the melt within a period of one half to one hour. The temperature was then allowed to drop to 95°–100° C. and 35–40 parts of metaldehyde $(CH_4O)_4$ were added in a period of 15–30 minutes. After a brief period of agitation the temperature was raised to 140°–150° C. and maintained within the said limits for approximately 4–6 hours.

The smooth melt was then drowned in a cold solution of hydrochloric acid (containing 5–10% HCl), heated to 50°–90° C. and subsequently filtered. The residue was washed with 2–5% hot hydrochloric acid and then with hot water until free of acid. The residual product was a dark powder dissolving in sulfuric acid and alkaline hydrosulfite vats. From the alkaline hydrosulfite vat cotton was dyed in shades fast to chlorine, washing and sunlight. The product obtained may also be used for printing purposes.

Special mention may be made of certain other aldehydes which may be utilized to produce related dyestuffs. These include such products as para-aldehyde, para-formaldehyde, ortho-chloro-benzaldehyde, benzaldehyde, para-chloro-benzaldehyde, meta-nitro-benzaldehyde, naphthaldehyde, chloro-naphthaldehydes, nitro-naphthaldehydes, anthraquinone-2-aldehyde, 1-chloro-anthraquinone-2-aldehyde, 1-nitro-anthraquinone-6-aldehyde, 1-amino-anthraquinone-2-aldehyde, 1-amino-anthraquinone-6-aldehyde and their analogs and homologs.

V—With Di-Halo-Methyl Compounds

Example VIII

In a suitable receptacle, there was placed 500–600 parts of antimony tri-chloride and the same heated to 180° C. To this melt was added 250–

350 parts of anhydrous aluminum chloride under agitation. During the addition the temperature dropped to 100°–120° C. It was raised to 150°–155° C. in order to permit the aluminum chloride to digest completely. When a clear solution was obtained, the temperature was lowered to 100°–120° C. and 100 parts of finely powdered isoviolanthrone were introduced over a period of ½ to 1 hour. Complete digestion took place, this operation consuming approximately 30 minutes at 110°–120° C.

When this was accomplished 40–50 parts of ortho-chloro-benzal chloride were introduced into the melt at 90°–100° C. at such a rate as not to allow the temperature to rise over 100°–105° C. When the addition was complete the temperature was cautiously raised to 140°–160° C. for a period of 2–4 hours. The smooth melt was then drowned in a cold solution of hydrochloric acid containing 5–10% HCl, heated to 50°–90° C. and subsequently filtered. The residue was washed with 2–5% hot hydrochloric acid and then with hot water until free of acid. The reaction apparently proceeds in such a manner as to allow the chlorine atom in the phenyl nucleus to remain intact. This fact may be substantiated by an elementary analysis of the end product. The residual product was a dark paste, suitable for printing or dyeing. The dried product dissolves in concentrated sulfuric acid solution. The printings and dyeings from the new dye are fast to chlorine, washing and sunlight.

While related products may be obtained by replacing the ortho-chloro-benzal chloride with other omega-di-halogen methyl compounds in general, special mention may be made of benzal chloride, para-brom-benzal chloride, meta-nitro-benzal chloride, alpha and beta-(di-chloro-methyl)-naphthalenes and chloro and nitro substituted alpha and beta (di-chloro-methyl) naphthalenes. Still other compounds which may be mentioned are 1-chloro-2-omega-di-chloro-methyl-anthraquinone, 1-chloro-6-omega-di-chloro-anthraquinone, 1-nitro-6-omega-di-chloro-methyl-anthraquinone, 1-amino-2-omega-di-chloro-methyl-anthraquinone and 1-amino-6-omega-di-chloro-methyl-anthraquinone.

The catholicity of the reaction of this invention whereby an isoviolanthrone is mono-substituted is apparent from the preceding description and specific examples. As has been shown, acyclic, carbocyclic and heterocyclic reagents are especially suitable. Aromatic compounds such as those of the benzene, napththalene, anthracene and phenanthrene series are deserving of special mention. The condensed ring compounds of the naphthalene and anthraquinone series are especially desirable.

The amount of antimony tri-chloride or other metal halide used as an adjuvant in the aluminum chloride melt may be varied over a wide range or omitted entirely. The addition (even in substantial proportions) of other metal salts such as sodium chloride, zinc chloride and ferric chloride (particularly those of metals exhibiting more than one valence) to the melt for the purpose of producing proper fluidity, viscosity, melting point and other physical and/or chemical conditions and reactions, may be made if found economical and expedient. From this and the specific examples, it will be clear that it is not necessary for the aluminum tri-chloride used to be of high purity.

Antimony tri-chloride is a particularly desirable adjuvant. It is a solid at ordinary temperatures (temperatures up to 70°–80° C.). When in a fluid state above 70° C. this chloride is apparently capable of forming a solution or an eutectic mixture with aluminum chloride. The latter chloride is a solid body below 150—180° C. at which temperature it tends to sublime when heated by itself. A mixture of 3 to 5 parts of antimony tri-chloride and 1 to 2 parts of aluminum chloride (based upon 1 part of isoviolanthrone) when heated together to 80°–100° C. form a fluid melt in which isoviolanthrone dissolves readily.

When this dye is introduced into such a melt and allowed to dissolve or disperse within said melt, and when to the resultant solution or dispersion, the compounds desired to be condensed with isoviolanthrone, are introduced a reaction ensues at a relatively low temperature (100°–160° C.). The melt during such reaction maintains a fluid appearance. In some instances the condensations are complete within a short period of time for instance a fraction of an hour. When the reactions are complete the new condensing agents of this invention permit the reaction mass to be handled with great ease.

The condensing agents disclosed in this invention may influence the orientation of the substituted groups in the resultant condensation product.

The temperature limits set forth in the foregoing examples are capable of wide variation without harmful change in results. Ordinarily the temperature range of 80°–200° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the products has been noted after prolonged heating in the reaction melt.

As will be clear from the above the condensations in the presence of anhydrous aluminum chloride may be carried out either with or without an organic solvent or diluent. Suitable solvents include tri-chloro-benzene and nitro-benzene as well as similar organic compounds well known to those skilled in the art for example, tri-chloro-ethylenes and tetra-chloro-ethylenes.

The proportions of the reactants may be widely varied without seriously impairing the results. An excess of either reactant remains in the melt when the reaction is complete and may be removed from the final product by suitable means. The reactant present in the least molecular proportion is substantially quantitatively consumed during the reaction. Any excess of isoviolanthrone may be separated from the condensation product by virtue of a diverse solubility in such solvents as concentrated sulphuric acid, organic solvents and alkaline hydrosulfite solutions. Any excess of the other reactants may be removed by suitable expedients for example, extraction with organic solvents or aqueous alkaline solutions.

The reactions involved in this invention may be carried out in vessels of various compositions for example, glass, enamel, cast iron and steel are suitable.

The exact change taking place in the isoviolanthrone molecule during the above described treatments is not known. It is believed that the condensation product in which the isoviolanthrone nucleus is linked through its Bz2 position to the nucleus of the body with which it was reacted, is produced. However, it is not desired to limit the invention to any particular theory and the above explanation is given only for the purpose of aiding in understanding the invention.

The term "dispersing" in the claims is used generally and may cover dissolving as well as the usual process known as dispersing.

The production of certain types of mono-substituted isoviolanthrones has previously been proposed as will be clear from a study of U. S. P. 1,644,849 but apparently the bluish-violet dyes obtained do not have properties such as to make them commercially important at the present time.

OXIDATION, REDUCTION AND STABILIZATION OF MONO-SUBSTITUTED ISOVIOLANTHRONES

Example IX

One hundred (100) parts of a mono-substituted isoviolanthrone obtained by condensing 1-chloroisoviolanthraquinone-2-carbonyl chloride with isoviolanthrone were dissolved in 1500–3000 parts of 95–100% sulfuric acid at below 35° C. After complete solution had taken place the temperature was brought down to 20°–25° C. Then while agitating 100–120 parts of technical (the very pure compound may be used with satisfactory results) manganese dioxide were fed into the solution at such a rate as not to allow the temperature to rise over 25° C. When the addition was complete, the mass was agitated at room temperature for 10–15 hours. The resultant mass was then poured into water and diluted to approximately 5–8% acidity.

The resulting suspension was filtered and was washed with several portions of cold water. The residue was then suspended in 8000 parts of water in which was dissolved 120 parts of sodium bisulfite. This suspension was made strongly acid by adding 150 parts of 66° Bé. sulfuric acid and the resulting suspension was heated gradually to the reflux temperature. Heating was continued until no further sulfur dioxide was evolved. The resulting dyestuff was isolated by filtration and was washed free from acid with hot water.

The product was soluble in alkaline hydrosulfite to yield a greenish-blue vat from which cotton was dyed in rather dull greenish-blue shades. The dyeings were not fast to acid nor alkali.

The filter cake was transferred into 2000 parts of nitrobenzene under strong agitation. There was added 10 parts of sodium carbonate dissolved in 15 parts of water. The resulting suspension was heated very gradually to 160° C. in such a manner that the distillate could be collected, separated and the nitrobenzene body returned to the reaction mass. When the dehydration was completed, the charge was cooled to 80° C. and there was added 190 parts of powdered anhydrous sodium carbonate. The temperature was again raised to 160°–165° C. and there was added during the course of 2–4 hours 120 parts of dimethyl sulfate. Heating at this temperature was continued until a test sample yielded dyeings which were fast to acid and alkali. The charge was then cooled to room temperature and was filtered. Residual solvent was removed from the residue by steam distillation after which the product was again filtered and thoroughly washed. It was thus obtained, when dry, as a dark greenish-black powder yielding green solutions in sulfuric acid. It is soluble in alkaline hydrosulfite to a greenish-blue vat from which cotton is dyed in level greenish-blue shades of very good fastness. The product dyes by warm or cold dyeing methods either as a self color or in combination with other vat dyestuffs. When converted to a suitable printing paste, it yields very satisfactory prints.

Example X

Thirty-five (35) parts of the product obtained by condensation of isoviolanthrone with phthalic anhydride (in a medium of antimony trichloride and aluminum chloride) were dissolved in 1050 parts of 95% $H_2SO_4$. The solution was agitated at below 25° C. and there was added 38.5 parts of technical manganese dioxide during the course of 2–4 hours. Agitation was continued at room temperature over a period of 10–15 hours after which the oxidation was complete. The oxidation product was isolated and reduced with sodium bisulfite in a manner entirely similar to that described in Example IX. It was very similar in appearance to the product of Example IX and yielded greenish-blue dyeings from a greenish-blue alkaline hydrosulfite vat.

The reduced product was transferred without drying into 700 parts of nitrobenzene, 3.5 parts of sodium carbonate were added, and the charge was dehydrated as in Example IX. When all of the water had been removed, it was cooled to 80° C. and an additional 60 parts of sodium carbonate were added. The temperature was then raised to 160°–165° C. whereat during the course of 2–3 hours, there were added 38.5 parts of dimethyl sulfate. Heating at 160°–165° C. was continued until a test sample yielded dyeings fast to acid and alkali. The charge was then cooled and the product was isolated as in Example IX. It was thus obtained, when dry, as a blue-black powder dissolving in concentrated sulfuric acid with a green coloration. It is soluble in alkaline hydrosulfite to a blue vat from which cotton is dyed in navy blue shades of good brightness. It dyes well in combination with either warm or cold dyeing vat dyestuffs.

Example XI

Thirty-five (35) parts of the condensation product derived from isoviolanthrone and paranitrobenzoyl chloride was dissolved in 1050 parts of 95% sulfuric acid. The solution was agitated at room temperature and there was added during a period of 2 hours, 38.5 parts of technical manganese dioxide. The temperature was then gradually raised to 60° C. and was held at 60°–65° C. during the course of 10–15 hours. After cooling to room temperature, the reaction mixture was drowned in a large volume of water and the product was filtered. The residue was transferred into 3000 parts of water containing 40 parts of sodium bisulfite in solution. There was added 40 parts of 78% sulfuric acid and the suspension was heated to the reflux temperature. Heating was continued until no further sulfur dioxide was evolved after which the product was removed by filtration. It was washed free from acid and metallic salts with hot water.

The residue was transferred into 700 parts of nitrobenzene contained in a suitable iron kettle and there was added 3.5 parts of sodium carbonate dissolved in a small amount of water. The resulting suspension was freed from water by heating gradually to 160° C. It was cooled slightly and an additional 67 parts of dry sodium carbonate was added. The temperature was adjusted to 160°–165° C. and there was added during the course of 2–3 hours, 40 parts of dimethyl sulfate. Heating at 160°–165° C. was continued for 30 minutes longer, after which the charge was cooled to room temperature. It was then filtered and the residue was freed from nitrobenzene by steam distillation. The product was recovered, when dry, as a bronze-blue powder. It yields green solutions in sulfuric acid and is soluble in alkaline hydrosulfite to a greenish-blue vat from which cotton is dyed in navy-blue shades.

*Example XII*

The condensation product derived from isoviolanthrone and 2-anthraquinone-carbonyl chloride was oxidized, reduced and alkylated exactly as in Example IX. The product was very similar to that of Example IX but dyed in considerably greener shades of blue. It also dyes by either cold or warm dyeing methods and is particularly suitable for combination dyeings with other anthraquinone vat dyestuffs.

*Example XIII*

To a suspension of an oxidized mono-substituted isoviolanthrone having a 5–8% acidity prepared as described above in Example IX and which contains an excess of manganese dioxide, there was added 100–150 parts of sodium bisulfite and the whole boiled for 1–2 hours. The sodium bisulfite rendered the excess of manganese dioxide water soluble and at the same time converted the oxidized dyestuff to its enolic form, the original oxidation product being presumed to be in the keto form. The precipitate was then separated by filtration and washed acid free. Thereafter the residual cake was suspended in approximately 1500–2000 parts of water containing 50–75 parts of solid caustic soda. The alkaline suspension was vigorously stirred to break up the lumps and the dye was subsequently reduced to solution form with 40–50 parts of sodium hydrosulfite at 60°–70° C. The reduction to the leuco took place almost instantaneously. After one-half hour of agitation at the indicated temperature, precipitation began and within two hours the sodium salt of the enolic form of the dye completely separated in a uniform crystalline form. The precipitate was then separated by precipitation and washed with hot water until free of alkali.

The product thus obtained was a powder when dry. It dissolves in concentrated sulfuric acid, is insoluble in all ordinary organic solvents, and dyes cotton from a hydrosulfite vat.

*Example XIV*

One hundred (100) parts of the sodium salt of the reduction product obtained in Example XIII were suspended in 600–800 parts of dichlorobenzene and to this suspension were added 75–100 parts of soda ash and 50–75 parts of dimethyl sulfate. The whole was heated to 140°–170° C. under agitation for a period of 3–6 hours. The resulting soluble dye was then filtered off at 100°–120° C., washed with dichlorobenzene and ethyl alcohol, followed by washing with hot water until the excess soda ash and sodium sulfate resulting from the alkylation reaction were completely removed. The product thus obtained was a powder which dissolved in concentrated sulfuric acid solution and dyed cotton from alkaline hydrosulfite vats. The product in paste form is suitable for printing cotton. It dyes either from a cool or warm hydrosulfite bath alone and in combination with other vat dyes. Rayon (that is, regenerated cellulose) may be dyed with this product from a weak alkaline hydrosulfite vat.

In the above described oxidation procedures, the quantities of acids used may be 10–40 parts greater and still be within the range of economical operation. Less manganese dioxide than that specified above may be used if desired. Any more than the maximum amount of acid specified would be superfluous and would serve no useful purpose. Excesses of manganese dioxide remain inert and therefore no advantage is to be gained from its presence. The most satisfactory temperature range for the oxidation is from 10°–70° C. These limits are not absolutely fixed however, since the range may be extended at both ends at the expense of time of operation and/or loss of reagents and the desired products. No useful purpose has been found in extending the oxidation step for more than 10 hours above the limits set out above. At room temperature no harm is incurred by continued treatment with the oxidizing substances after the desired oxidation is complete.

The alkylations described above may be affected in ordinary or usual suspension media such as nitrobenzene, ortho-nitro-toluene and the like. Somewhat less satisfactory suspension or solvent media include solvent naphtha, xylene, monochloro-benzene and tri-chloro-benzene. In general the temperature for the alkylation may vary from 100° C. up to the boiling point of the solvents used. Lower temperatures are not as desirable for the reason that the reaction is slower than is desirable. The ratio of solvent or suspension medium is not critical, although the preferred range is 4–30 parts. Six (6) hours generally suffices to complete the alkylation. A longer period of treatment is not detrimental.

Methods of oxidation, reduction and stabilization for vat dyes previously known to the art (for example, see U. S. Patents 1,531,260 and 1,531,261) have been found suitable for the treatment of the mono-substituted isoviolanthrones of this invention. In this connection mention may also be made of the processes described in U. S. Patent 472,121 and German Patent 242,379. Variations of such methods as well as of the methods of the above examples, will suggest themselves to those skilled in the art and such variations are considered a part of this invention.

Among the isoviolanthrones not specifically mentioned above, specific mention may be made of 6-chloro-isoviolanthrone and 6-nitro-isoviolanthrone as starting materials.

As many apparently widely different embodiments of this invention may be made without departing from the spirit and scope thereof, it is to be understood that we do not limit ourselves to the specific embodiments thereof except as defined in the appended claims.

We claim:

1. The process which comprises mono-substituting an isoviolanthrone initially having free Bz2, Bz2' positions by heating with a member of the group consisting of aldehydes, di-halo-methyl compounds, sulfonyl halides, carboxylic acid anhydrides and carbonyl halides, oxidizing the resultant by treatment with an oxidizing agent, reducing the oxidized product by treatment under reducing conditions and alkylating the reduced product by heating with an alkylating agent.

2. The process which comprises mono-substituting an isoviolanthrone initially having free Bz2, Bz2' positions by heating with a member of the group consisting of aldehydes, di-halo-methyl compounds, sulfonyl halides, carboxylic acid anhydrides and carbonyl halides.

3. The process of producing coloring matters of the vat color series which comprises oxidizing an isoviolanthrone mono-substituted with a carbon compound radical having a free Bz2 position and thereafter reducing and stabilizing the reduced body.

4. An oxidized isoviolanthrone mono-substituted with a carbon compound radical which before mono-substitution had free Bz2, Bz2' positions.

5. The products of claim 1 which products are greenish to bluish-black powders, dissolving in sulfuric acid to form green solutions and soluble in alkaline hydrosulfite solutions to form greenish-blue to blue vats.

6. The products of claim 2 which products are dark blue to black powders, dissolving in sulfuric acid to form green solutions and soluble in alkaline hydrosulfite solutions to form blue to reddish-blue vats.

7. The process of producing vat colors which comprises oxidizing the product obtained by condensing one molecular proportion of an isoviolanthrone having free Bz2, Bz2' positions with one molecular proportion of a member of the group consisting of aldehydes, di-halo-methyl compounds, sulfonyl halides, carboxylic acid anhydrides and carbonyl halides and thereafter reducing and stabilizing the oxidized body.

8. An oxidized isoviolanthrone derivative obtainable by oxidizing the product resulting from condensing one molecular proportion of a member of the group consisting of aldehydes, di-halomethyl compounds, sulfonyl halides, carboxylic acid anhydrides and carbonyl halides with one molecular proportion of an isoviolanthrone having free Bz2, Bz2' positions.

9. Process which comprises melting 600 parts of anhydrous antimony trichloride and bringing the same to 180° C., adding under good agitation 300 parts of aluminum chloride, bringing the temperature to 150° C. and maintaining the same until the resultant melt is homogeneous, cooling the melt to 95° C.–100° C., adding 100 parts of isoviolanthrone portion-wise at such a rate that the temperature remains practically constant, homogenizing the melt, adding 74 parts of 1-chloro-anthraquinone-2-carbonyl chloride while maintaining the same temperature, raising the temperature to 140°–180° C., maintaining the temperature for 1–6 hours, cooling the reaction melt to 120°–130° C., drowning the resultant in a cold solution of 5–10% hydrochloric acid, agitating, heating to 90°–100° C., filtering, washing the filter cake with hot dilute hyrochloric acid until free from heavy metals salts, washing free from acid, adding 100 parts of the resultant product calculated on a dry basis to 1500–3000 parts of 95–100% sulfuric acid at a temperature below 35° C., allowing complete solution to take place, cooling to 20°–25° C., agitating with 100–120 parts of manganese dioxide while maintaining a temperature not above 25° C., agitating for 10–15 hours, pouring the resultant mass into water and diluting to 5–8% acidity, filtering, washing with cold water, suspending in 8000 parts of water containing 120 parts of sodium bisulfite, rendering the resultant strongly acid by the addition of 150 parts of 66° Bé. sulfuric acid and heating gradually to reflux temperature, continuing the heating until no further sulfur dioxide is evolved, filtering and washing free from acid, transferring the filter cake to 2000 parts of nitrobenzene with strong agitation, adding 10 parts of sodium carbonate dissolved in 15 parts of water, heating very gradually to 160° C., continuously collecting the distillate, separating the water and returning the nitrobenzene body to the reaction mass, maintaining the heating until dehydration is complete, cooling the charge to 80° C., adding 190 parts of anhydrous sodium carbonate, raising the temperature to 160°–165° C., adding during the course of 2–4 hours 120 parts of di-methyl sulfate, heating to this temperature until a test sample gives dyeings which are fast to acid and alkali and thereafter isolating the solid product.

10. The product of the process of claim 9 which is a dark greenish-black powder yielding green solutions in sulfuric acid dissolving in alkaline hydrosulfite to give a greenish-blue vat from which cotton is dyed level greenish-blue shades of very good fastness.

11. The process of producing vat colors which comprises replacing only one Bz2 hydrogen atom of an isoviolanthrone having free Bz2, Bz2' positions with a carbon compound radical, oxidizing the resultant, reducing the oxidized body and stabilizing the reduced body.

12. The process of producing vat colors which comprises replacing only one hydrogen atom of isoviolanthrone having free Bz2, Bz2' positions by condensing with a member of the group, consisting of aldehydes, di-halo-methyl compounds, sulfonyl halides, carboxylic acid anhydrides and carbonyl halides, oxidizing the resultant, reducing the oxidized body and stabilizing the reduced body.

13. An oxidized isoviolanthrone derivative obtainable by replacing only one Bz2 hydrogen atom of an isoviolanthrone having free Bz2, Bz2' positions with a carbon compound radical and oxidizing the resultant.

14. An oxidized violanthrone derivative obtainable by replacing only one hydrogen atom of an isoviolanthrone having free Bz2, Bz2' positions by condensing with a member of the group, consisting of aldehydes, di-halo-methyl compounds, sulfonyl halides, carboxylic acid anhydrides and carbonyl halides and oxidizing the resultant.

ALEXANDER JOHN WUERTZ.
WILLIAM HIRAM LYCAN.